(12) United States Patent
Johnson, Sr. et al.

(10) Patent No.: US 12,540,796 B2
(45) Date of Patent: *Feb. 3, 2026

(54) LEVER BASED CLAMPING DEVICE

(71) Applicant: Really Right Stuff, LLC, Lehi, UT (US)

(72) Inventors: Joseph M. Johnson, Sr., Lehi, UT (US); James Bolduc, Lehi, UT (US); Verent Chan, Lehi, UT (US)

(73) Assignee: Really Right Stuff, LLC, Lehi, UT (US)

( * ) Notice: Subject to any disclaimer, the term of this patent is extended or adjusted under 35 U.S.C. 154(b) by 36 days.

This patent is subject to a terminal disclaimer.

(21) Appl. No.: 18/665,236

(22) Filed: May 15, 2024

(65) Prior Publication Data

US 2024/0302137 A1   Sep. 12, 2024

Related U.S. Application Data

(63) Continuation of application No. 18/189,002, filed on Mar. 23, 2023, now Pat. No. 12,018,917, which is a continuation of application No. 17/929,073, filed on Sep. 1, 2022, now Pat. No. 11,644,281, which is a continuation of application No. 16/270,452, filed on Feb. 7, 2019, now Pat. No. 11,519,697.

(60) Provisional application No. 62/663,509, filed on Apr. 27, 2018.

(51) Int. Cl.
*F41G 11/00* (2006.01)
*F41A 23/12* (2006.01)

(52) U.S. Cl.
CPC ............ *F41G 11/003* (2013.01); *F41A 23/12* (2013.01)

(58) Field of Classification Search
CPC ..... F41G 11/003; F16M 11/041; F16M 11/16; F16M 2200/027; F16M 13/00; F41C 23/16; F41C 27/00; F41A 23/16; F41A 23/12; G03B 17/561; G03B 17/566
USPC ...................... 42/127, 124, 90, 125, 94, 148
See application file for complete search history.

(56) References Cited

U.S. PATENT DOCUMENTS

| | | |
|---|---|---|
| 3,324,558 A | 6/1967 | Hart |
| 3,750,318 A | 8/1973 | Burris |
| 4,079,534 A | 3/1978 | Snyder |
| 5,020,260 A | 6/1991 | Houghton |
| 5,155,915 A | 10/1992 | Repa |
| 5,276,988 A | 1/1994 | Swan |
| 5,347,740 A | 9/1994 | Rather |
| 5,467,552 A | 11/1995 | Cupp et al. |
| 5,533,292 A | 7/1996 | Swan |
| 5,581,046 A | 12/1996 | Weldle et al. |
| 5,680,725 A | 10/1997 | Bell |
| 5,806,228 A | 9/1998 | Martel et al. |
| 5,816,683 A | 10/1998 | Christiansen |
| 5,913,668 A | 6/1999 | Messer |
| 5,930,935 A | 8/1999 | Griffin |
| 6,272,785 B1 | 8/2001 | Mika |
| 6,295,754 B1 | 10/2001 | Otteman et al. |
| 6,318,014 B1 | 11/2001 | Porter |
| 6,442,883 B1 | 9/2002 | Waterman et al. |
| 6,499,245 B1 | 12/2002 | Swan |

(Continued)

FOREIGN PATENT DOCUMENTS

EP        3381793 A1     10/2018

*Primary Examiner* — Michael D David
(74) *Attorney, Agent, or Firm* — Chernoff, Vilhauer, McClung & Stenzel LLP

(57) ABSTRACT

A lever-based clamping device.

35 Claims, 18 Drawing Sheets

(56) References Cited

U.S. PATENT DOCUMENTS

| | | |
|---|---|---|
| 6,526,687 B1 | 3/2003 | Looney |
| 6,574,899 B1 | 6/2003 | Mostello |
| 6,606,813 B1 * | 8/2003 | Squire .................. F41G 11/003 42/111 |
| 6,618,976 B1 | 9/2003 | Swan |
| 6,773,172 B1 | 8/2004 | Johnson et al. |
| 6,779,290 B1 | 8/2004 | Houtsma |
| 6,874,269 B2 | 4/2005 | Chen et al. |
| 6,922,934 B1 | 8/2005 | Huan |
| 7,077,582 B2 | 7/2006 | Johnson |
| 7,107,716 B1 | 9/2006 | Liao |
| 7,131,228 B2 | 11/2006 | Hochstrate et al. |
| RE39,465 E | 1/2007 | Swan |
| 7,240,600 B1 | 7/2007 | Bordson |
| 7,260,912 B2 | 8/2007 | Liu |
| 7,305,790 B2 | 12/2007 | Kay |
| 7,313,884 B2 | 1/2008 | Eddins |
| 7,493,721 B2 | 2/2009 | Swan |
| 7,614,175 B2 | 11/2009 | Davis et al. |
| 7,739,824 B1 | 6/2010 | Swan |
| 7,757,422 B1 | 7/2010 | Swan |
| 7,757,423 B1 | 7/2010 | Swan |
| 7,793,452 B1 | 9/2010 | Samson et al. |
| 7,802,395 B1 | 9/2010 | Swan |
| 7,810,271 B2 | 10/2010 | Patel |
| 7,823,318 B2 | 11/2010 | Hall |
| 7,886,476 B1 | 2/2011 | Swan |
| 7,905,045 B1 | 3/2011 | Swan |
| 7,908,782 B1 | 3/2011 | LaRue |
| 7,938,055 B2 | 5/2011 | Hochstrate et al. |
| 8,348,214 B2 | 1/2013 | Vogt |
| 8,398,037 B2 | 3/2013 | Johnson et al. |
| 8,549,786 B1 | 10/2013 | Griffith |
| 8,567,105 B1 | 10/2013 | Bobro |
| 8,806,796 B1 | 8/2014 | Clifton |
| 9,298,069 B2 | 3/2016 | Johnson, Sr. |
| D757,886 S | 5/2016 | Cheng et al. |
| 9,464,863 B2 | 10/2016 | Mather et al. |
| 9,671,198 B2 | 6/2017 | Bartoszewicz |
| 10,048,040 B1 | 8/2018 | Ratliff |
| 10,612,718 B2 | 4/2020 | Johnson, Sr. |
| 11,085,736 B2 | 8/2021 | Johnson, Sr. |
| 11,307,000 B2 | 4/2022 | Ma |
| 11,519,697 B2 | 12/2022 | Johnson, Sr. et al. |
| 2002/0162267 A1 | 11/2002 | Nelson |
| 2005/0041966 A1 | 2/2005 | Johnson |
| 2006/0117636 A1 | 6/2006 | Newhall |
| 2006/0123686 A1 | 6/2006 | Larue |
| 2006/0175482 A1 | 8/2006 | Johnson |
| 2006/0177215 A1 | 8/2006 | Johnson |
| 2006/0207156 A1 | 9/2006 | Larue |
| 2007/0033851 A1 | 2/2007 | Hochstrate et al. |
| 2008/0092421 A1 | 4/2008 | Beckman |
| 2008/0168696 A1 | 7/2008 | Ornce et al. |
| 2008/0178511 A1 | 7/2008 | Storch et al. |
| 2008/0216380 A1 | 9/2008 | Teetzel |
| 2009/0038201 A1 | 2/2009 | Cheng et al. |
| 2010/0018101 A1 | 1/2010 | Moody |
| 2010/0107467 A1 | 5/2010 | Samson et al. |
| 2010/0122485 A1 | 5/2010 | Kincel |
| 2010/0307042 A1 | 12/2010 | Jarboe et al. |
| 2012/0167438 A1 | 7/2012 | Daniel et al. |
| 2013/0000176 A1 | 1/2013 | Goertzen |
| 2013/0236235 A1 | 9/2013 | Johnson, Sr. |
| 2013/0256484 A1 | 10/2013 | Kessler et al. |
| 2013/0283663 A1 | 10/2013 | Joplin |
| 2014/0373329 A1 | 12/2014 | Volfson |
| 2015/0068095 A1 | 3/2015 | Collin et al. |
| 2019/0128470 A1 | 5/2019 | Johnson, Sr. |
| 2019/0145731 A1 | 5/2019 | Chen |
| 2019/0162362 A1 | 5/2019 | Chen |
| 2019/0331459 A1 | 10/2019 | Johnson, Sr. et al. |
| 2019/0331460 A1 | 10/2019 | Johnson, Sr. |
| 2021/0325149 A1 | 10/2021 | Johnson, Sr. |
| 2023/0003486 A1 | 1/2023 | Johnson, Sr. et al. |

* cited by examiner

LEVER BASED CLAMPING DEVICE

CROSS-REFERENCE TO RELATED APPLICATIONS

This application is a continuation of U.S. patent application Ser. No. 18/189,002 filed Mar. 23, 2023, which is a continuation of U.S. patent application Ser. No. 17/929,073 filed Sep. 1, 2022, now U.S. Pat. No. 11,644,281 issued May 9, 2023, which is a continuation of U.S. patent application Ser. No. 16/270,452 filed Feb. 7, 2019, now U.S. Pat. No. 11,519,697 issued Dec. 6, 2022, which claims the benefit of U.S. Provisional Patent Application No. 62/663,509 filed Apr. 27, 2018 entitled Lever Based Clamping Device.

BACKGROUND OF THE INVENTION

The present invention relates to a dual clamping device. More specifically, a dual clamping device that works in conjunction with commonly available dovetail brackets for imaging devices and commonly available accessory rails for rifles.

A Picatinny rail, also known as a MIL-STD-1913 rail, or Standardization Agreement 2324 rail, or also generally a NATO Accessory Rail referred to as STANAG 4694, is a bracket on some firearms that provides a mounting platform consisting of rails with multiple transverse slots. Referring to FIG. 1, the dimensions of the NATO Accessory Rail are illustrated. The Picatinny rail is designed to mount heavy sights and other attachments to the upper, side, or lower surfaces of all manner of weapons from crossbows to pistols and long arms up to and including anti-materiel rifles. The Picatinny rail consists of a strip undercut to form a flattened T cross-section provided with crosswise slots at intervals interspersed with flats that allow accessories to be slid into place from the end of the rail then locked in place; slid into the slots between raised flats then moved a short distance back or forth or clamped to the rail with bolts, and thumbscrews or levers. The Picatinny locking slot width is 0.206 in (5.23 mm). The spacing of slot centers is 0.394 in (10.01 mm) and the slot depth is 0.118 in (3.00 mm).

Referring to FIG. 2, FIG. 3, and FIG. 4, a NATO Picatinny Dovetail Adapter is illustrated. The adapter includes a body 100 with a clamp 110 that is movable with respect to the body 100. A set of three threaded screws 120, each of which may include a countersunk head 130, is rotatably interconnected with matching threads on the body 100. By rotation of the threaded screws 120, the clamp 110 is moved laterally with respect to the body 100. The body 100 defines a pair of dovetail groves 140 that fit arca-swiss style clamps.

Referring also to FIG. 5, the three screws 120 are loosened using a hex key until the jaw is fully opened. The body 100 is installed onto the rail 150 by aligning the screws with the slots in the rail. Each of the screws 120 are lightly tightened, and then further tightened using a hex key. Referring to FIG. 6, with the adapter securely affixed to the rail 150, a quick release clamp 160 may be detachably attached to the dovetail grooves 140 to support the firearm on a tripod.

Unfortunately, when the firearm is not being used with a compatible clamp the shooter may desire to remove the adapter from the firearm in an efficient manner which is a burdensome task. Also, the clamp that is detachably secured to the adapter tends to permit the firearm to slide within the clamp if not sufficiently secured in an efficient manner.

The foregoing and other objectives, features, and advantages of the invention may be more readily understood upon consideration of the following detailed description of the invention, taken in conjunction with the accompanying drawings.

DETAILED DESCRIPTION OF PREFERRED EMBODIMENT

Figure 1:
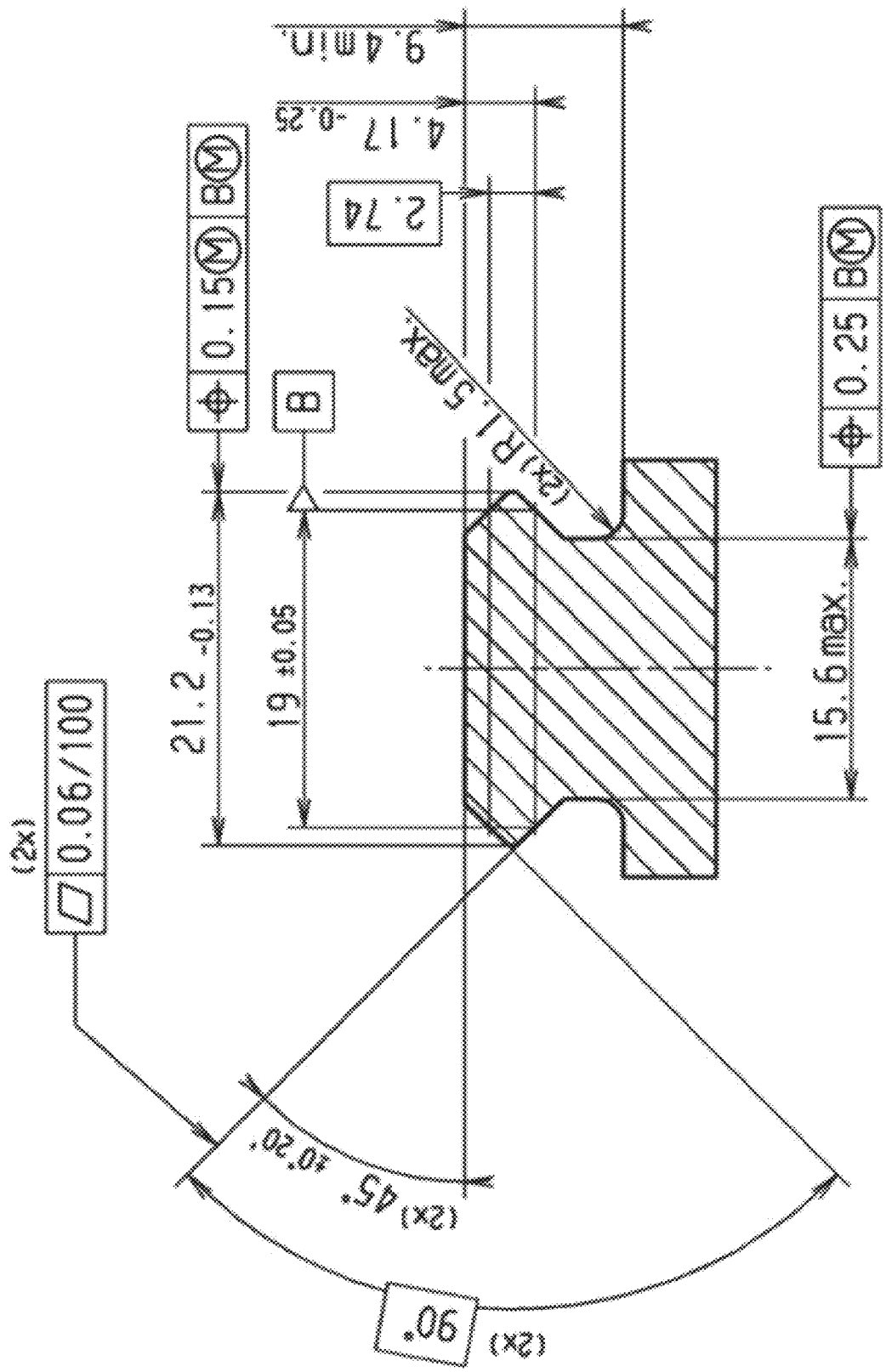
FIG. 1 illustrates a NATO Accessory Rail.
Figure 2:
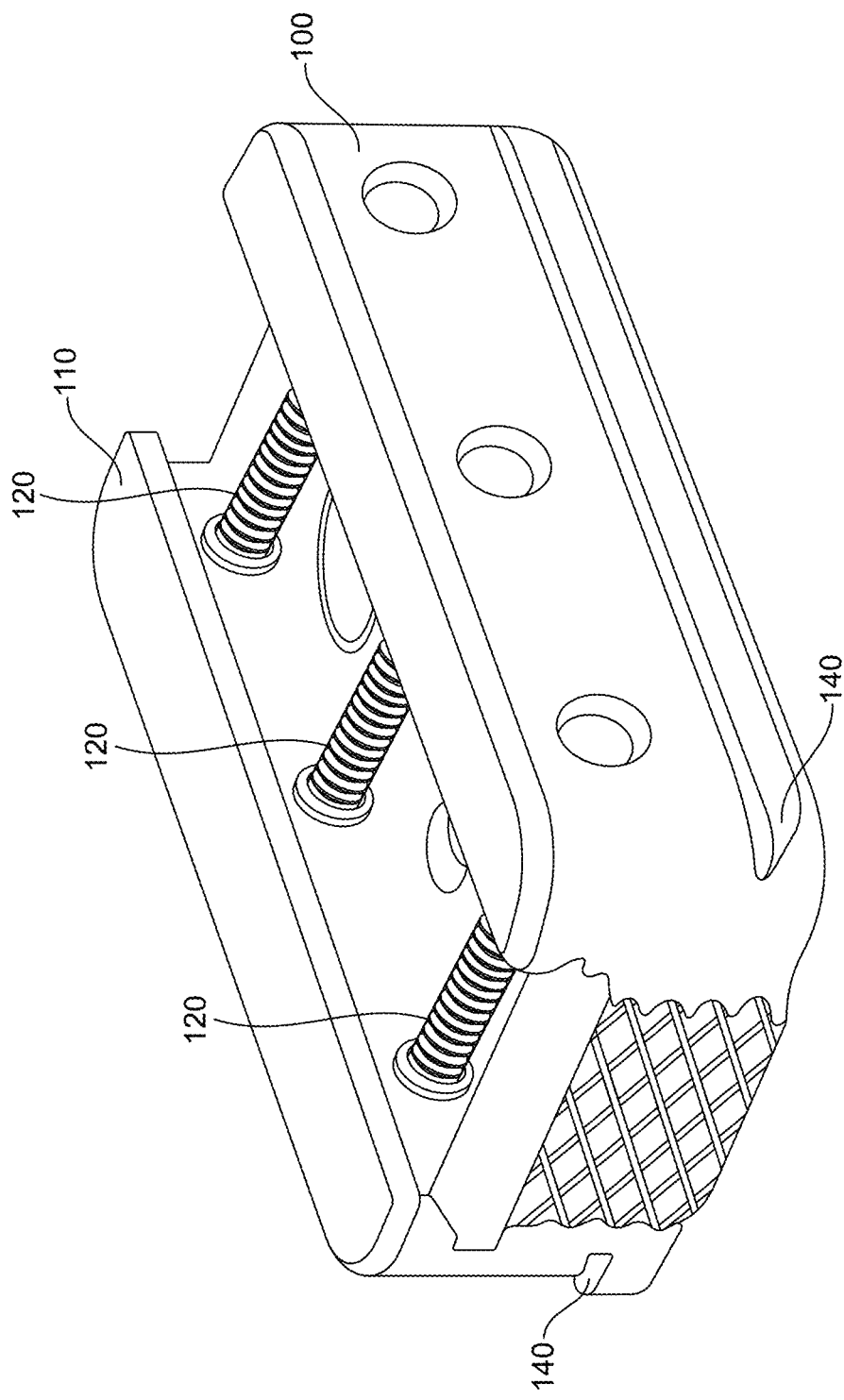
FIG. 2 illustrates a top perspective view of a NATO Picatinny Dovetail Adapter.
Figure 3:
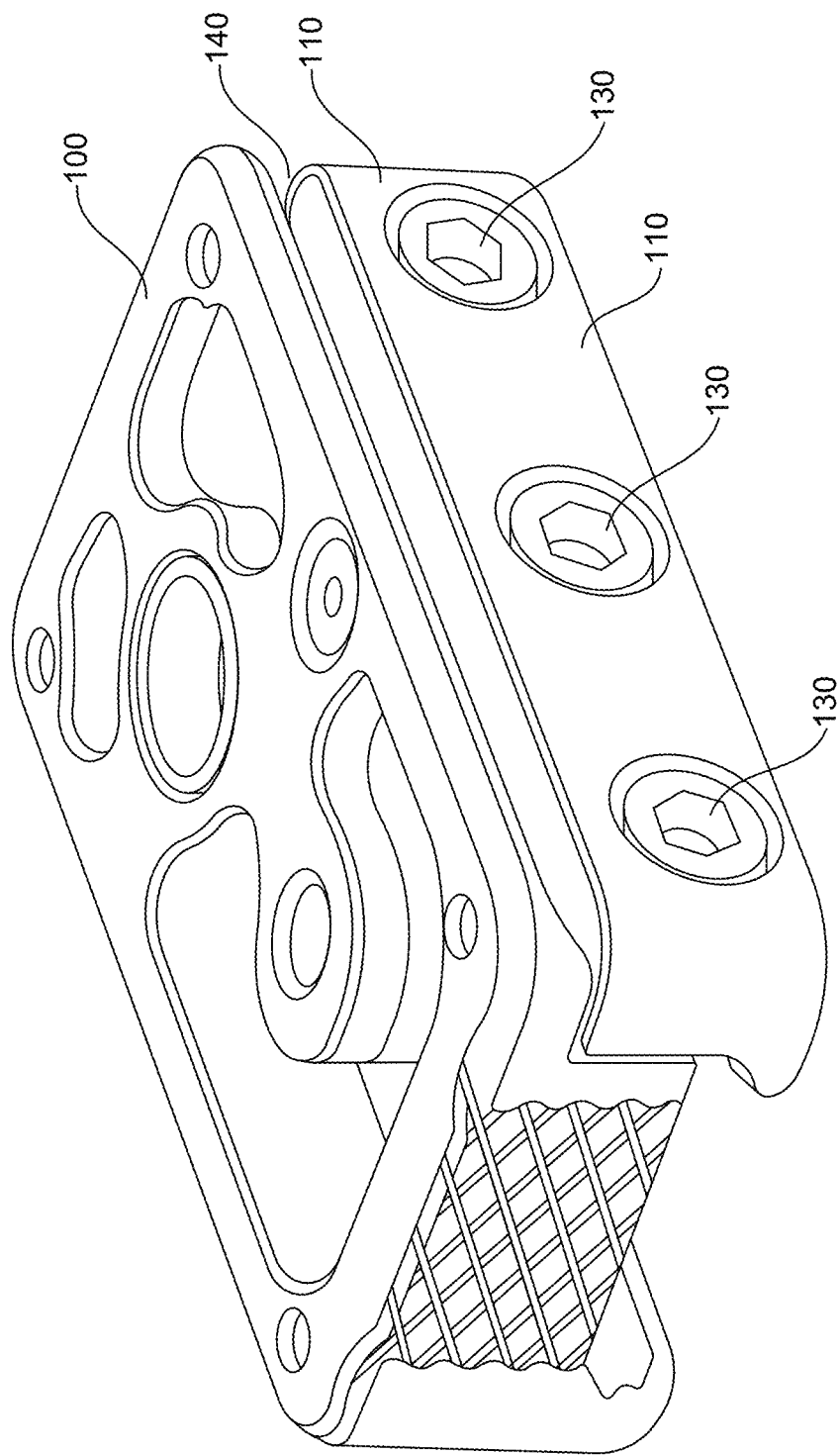
FIG. 3 illustrates a bottom perspective view of the NATO Picatinny Dovetail Adapter of FIG. 2.
Figure 4:
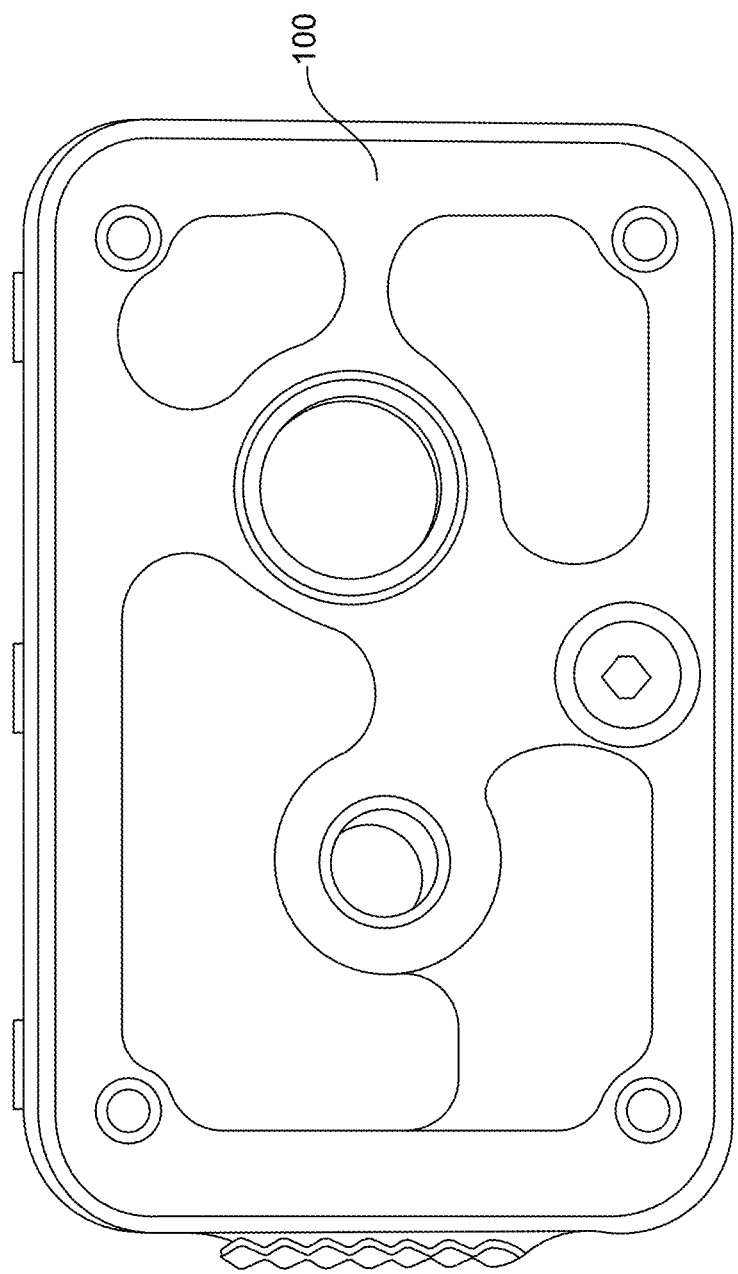
FIG. 4 illustrates a bottom view of the NATO Picatinny Dovetail Adapter of FIG. 2.
Figure 5:
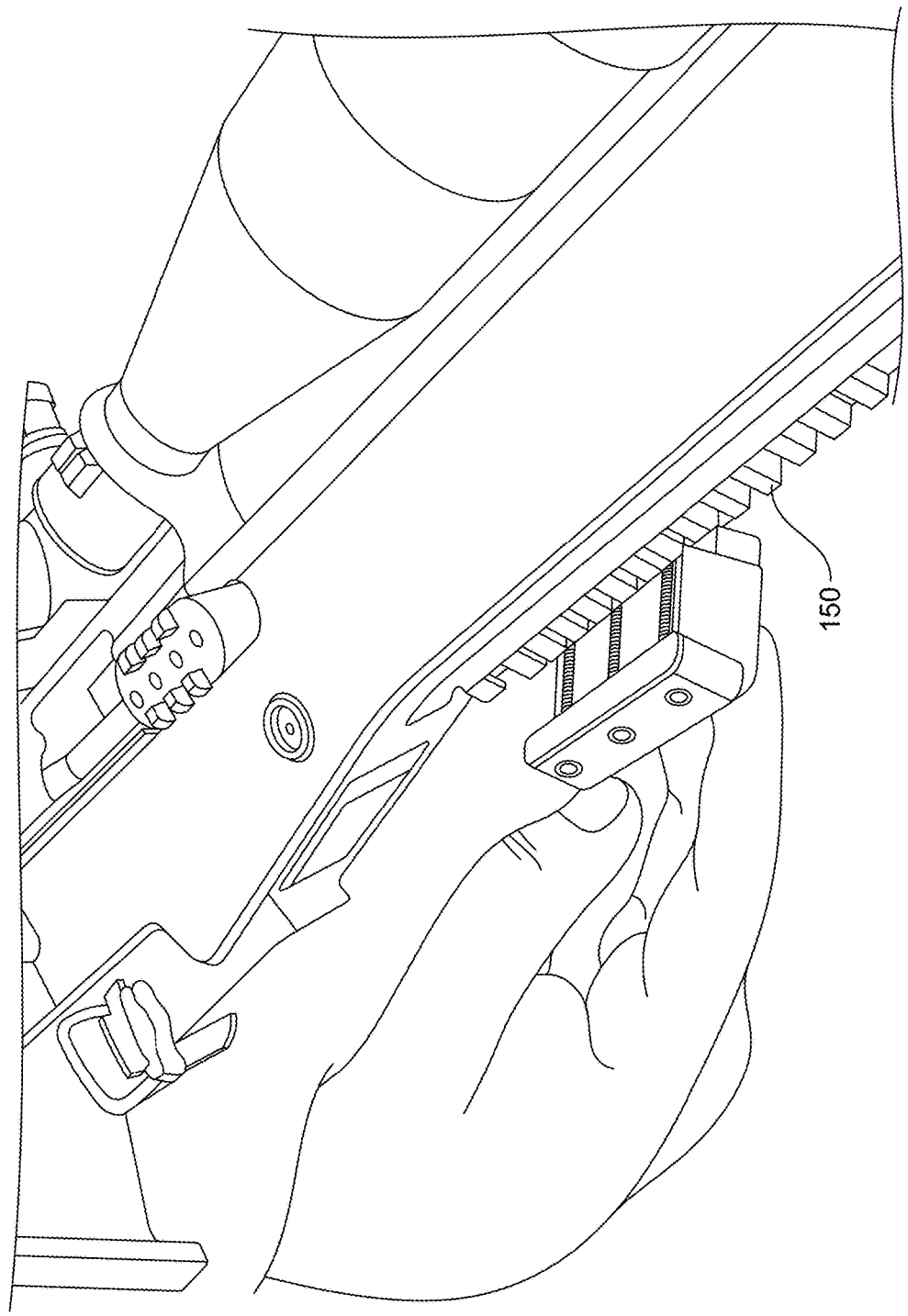
FIG. 5 illustrates the NATO Picatinny Dovetail Adapter of FIG. 2 being attached to a Picatinny rail.
Figure 6:
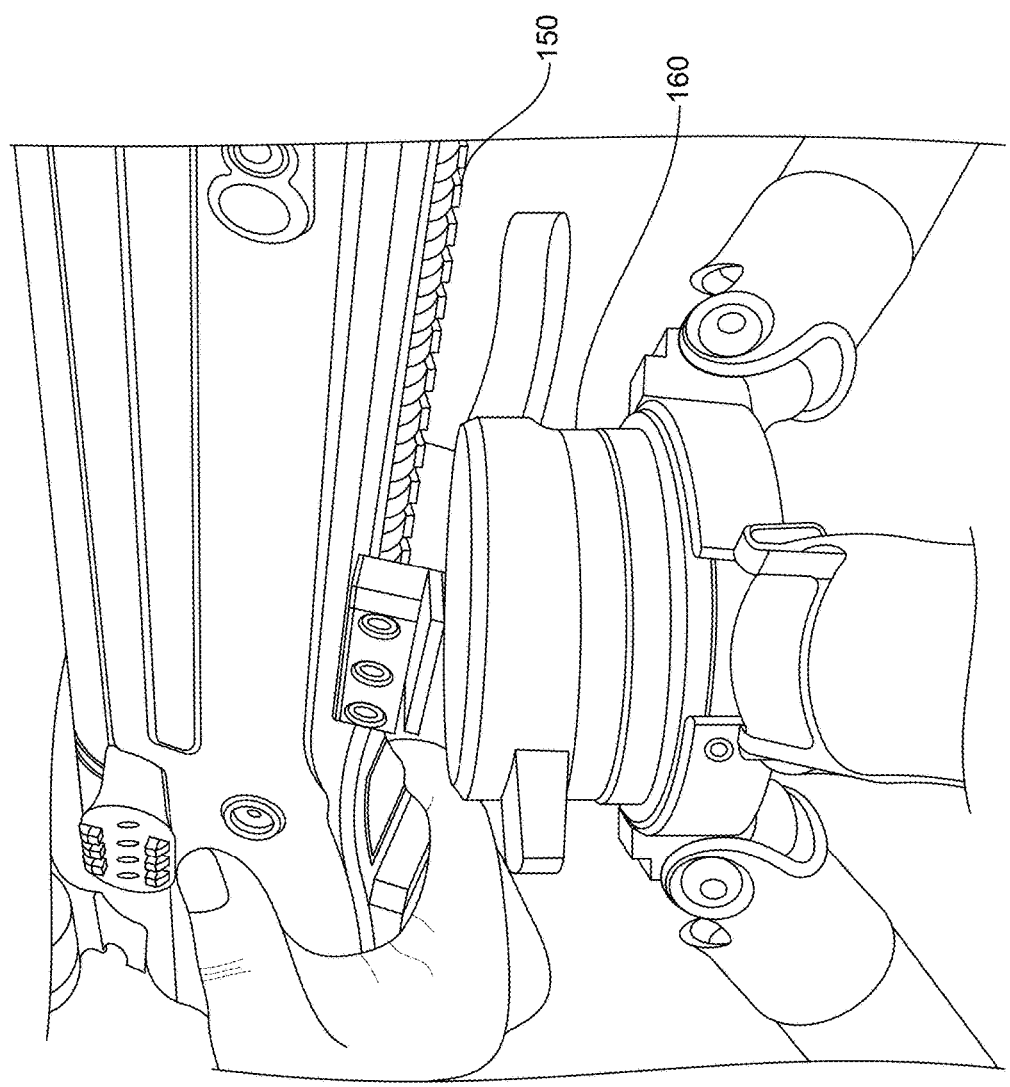
FIG. 6 illustrates the NATO Picatinny Dovetail Adapter of FIG. 2 attached to a Picatinny rail.
Figure 7:
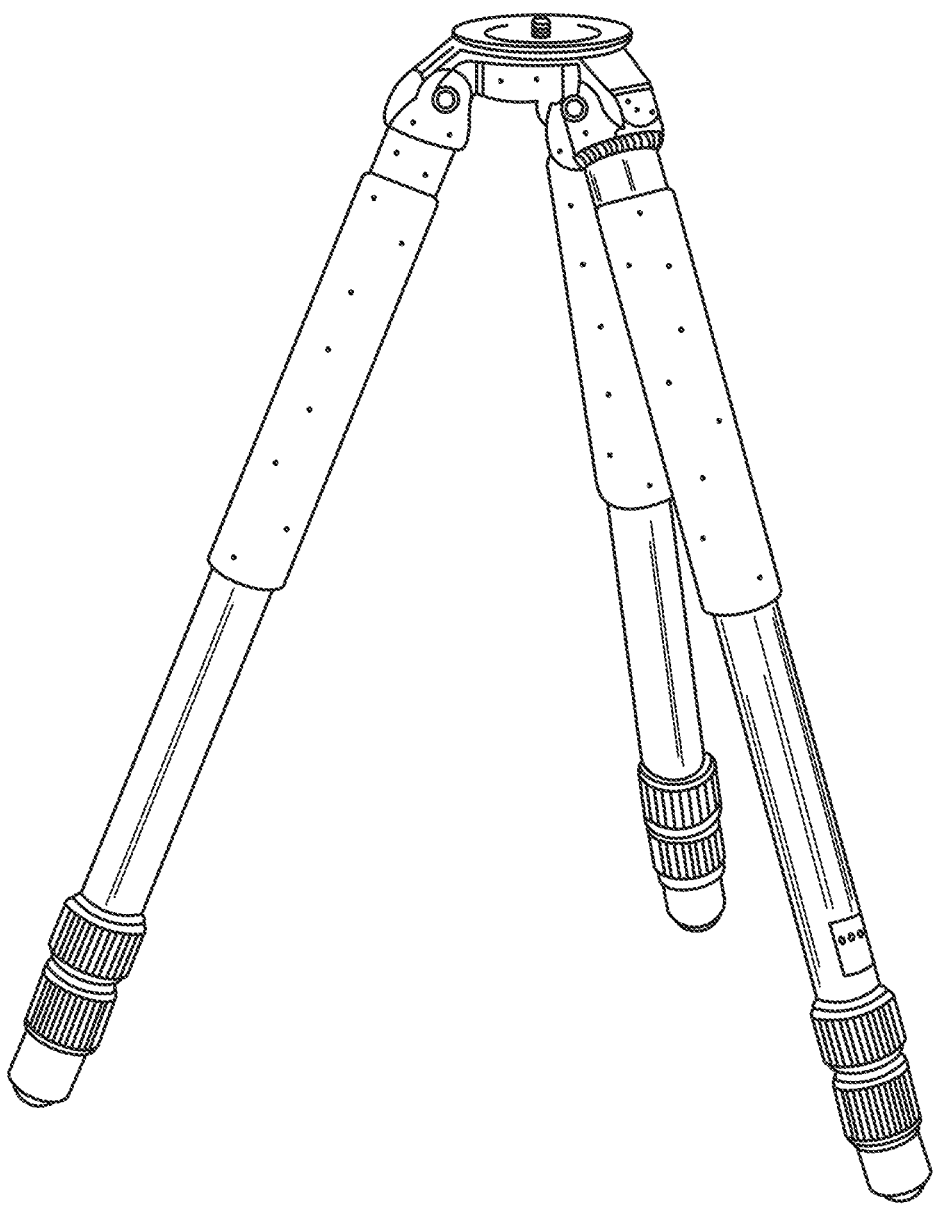
FIG. 7 illustrates a tripod.
Figure 8:
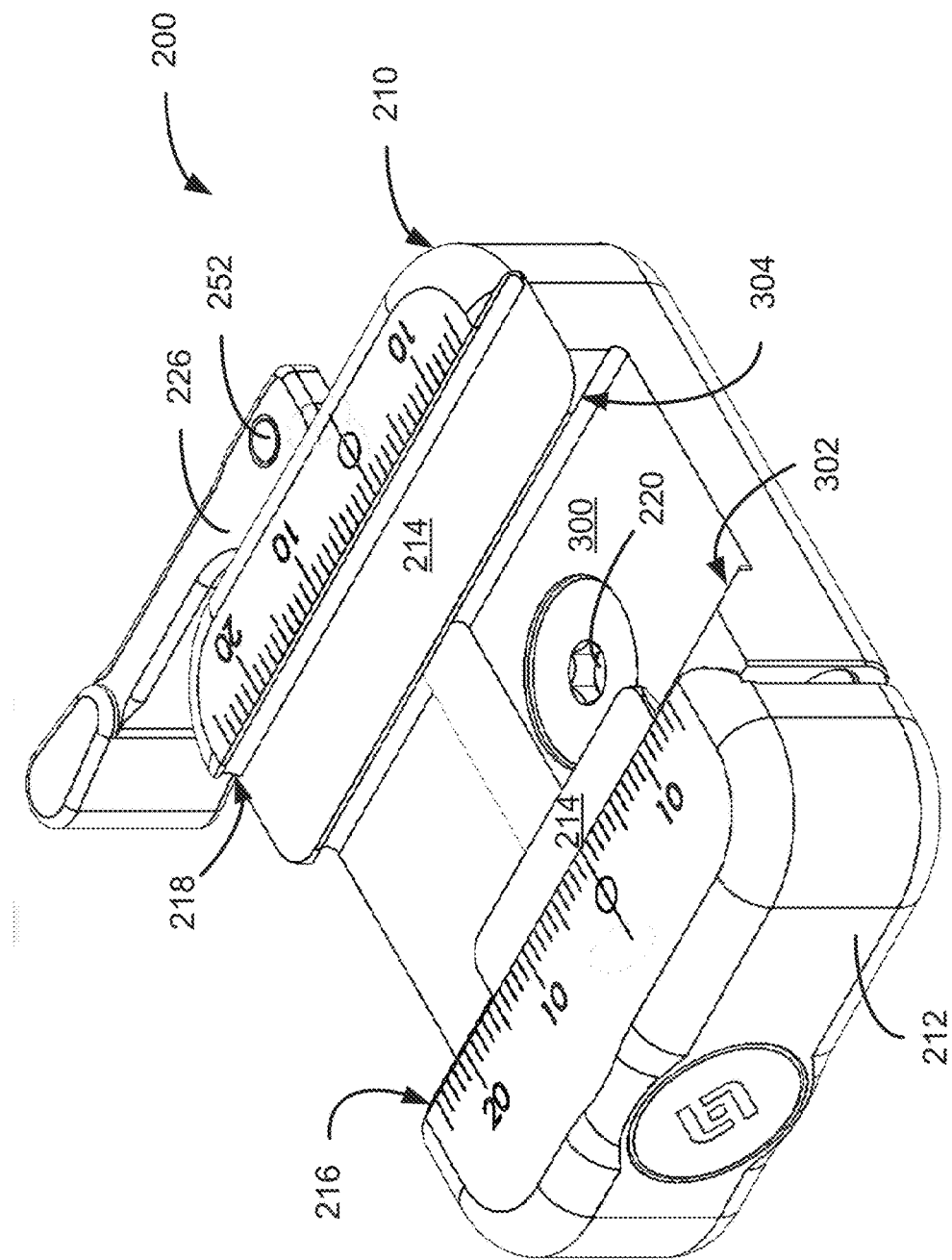
FIG. 8 illustrates an embodiment of a clamp assembly suitable to alternatively connect a dovetail plate of a camera or a Picatinny rail.
Figure 9:
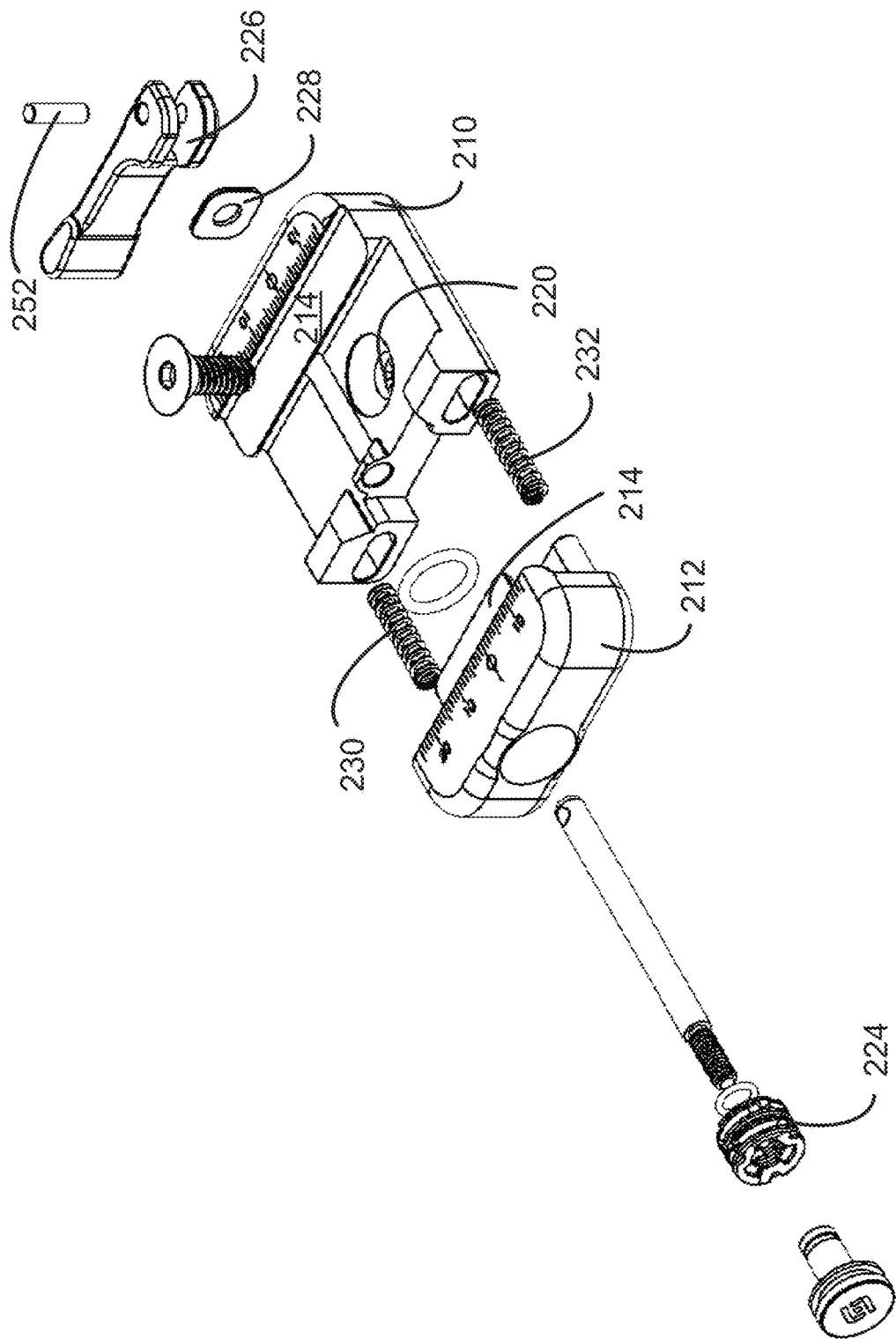
FIG. 9 illustrates an exploded view of clamp assembly of FIG. 8.
Figure 10:
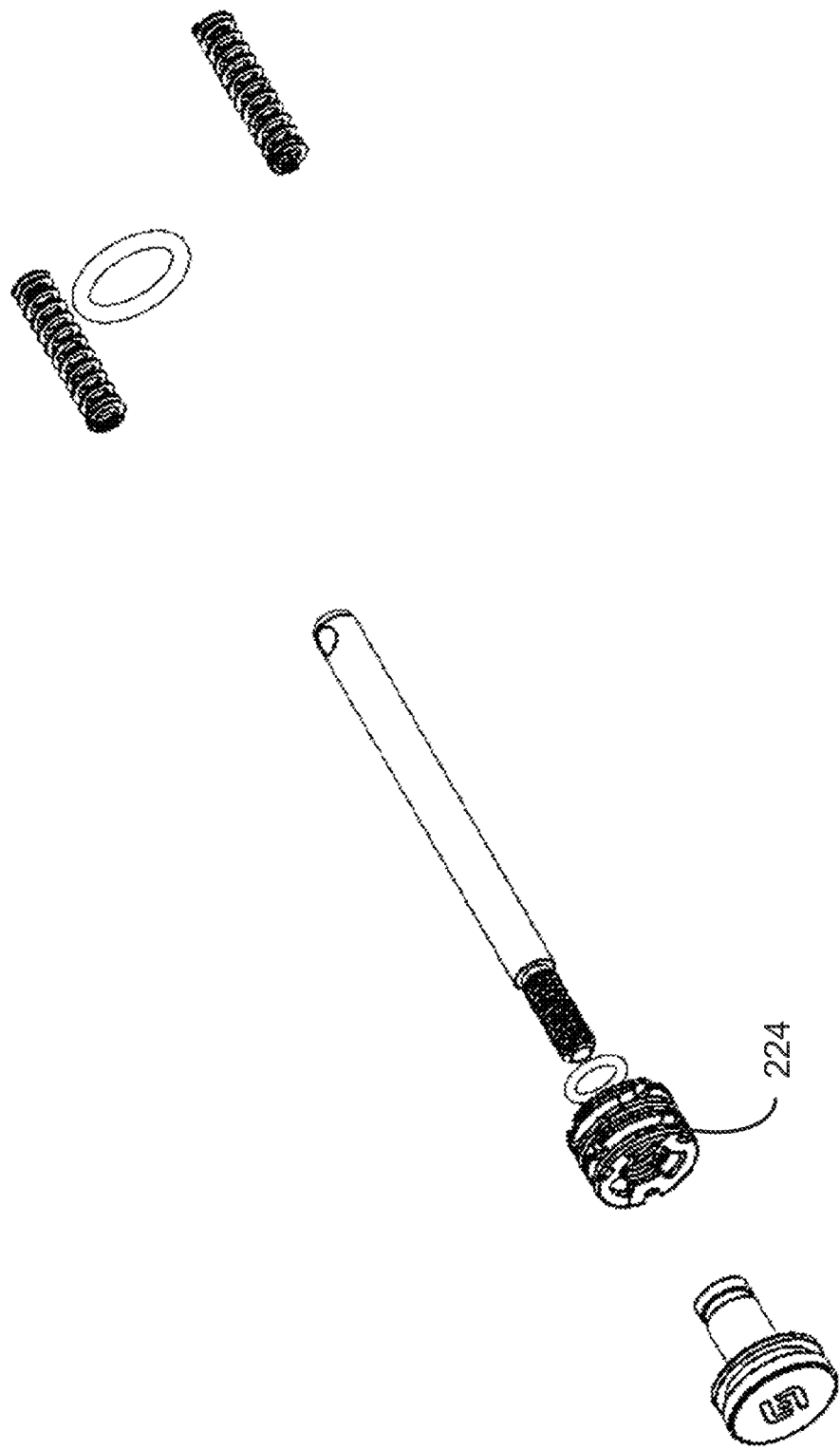
FIG. 10 illustrates a compression assembly of the clamp assembly of FIG. 8.
Figure 11:
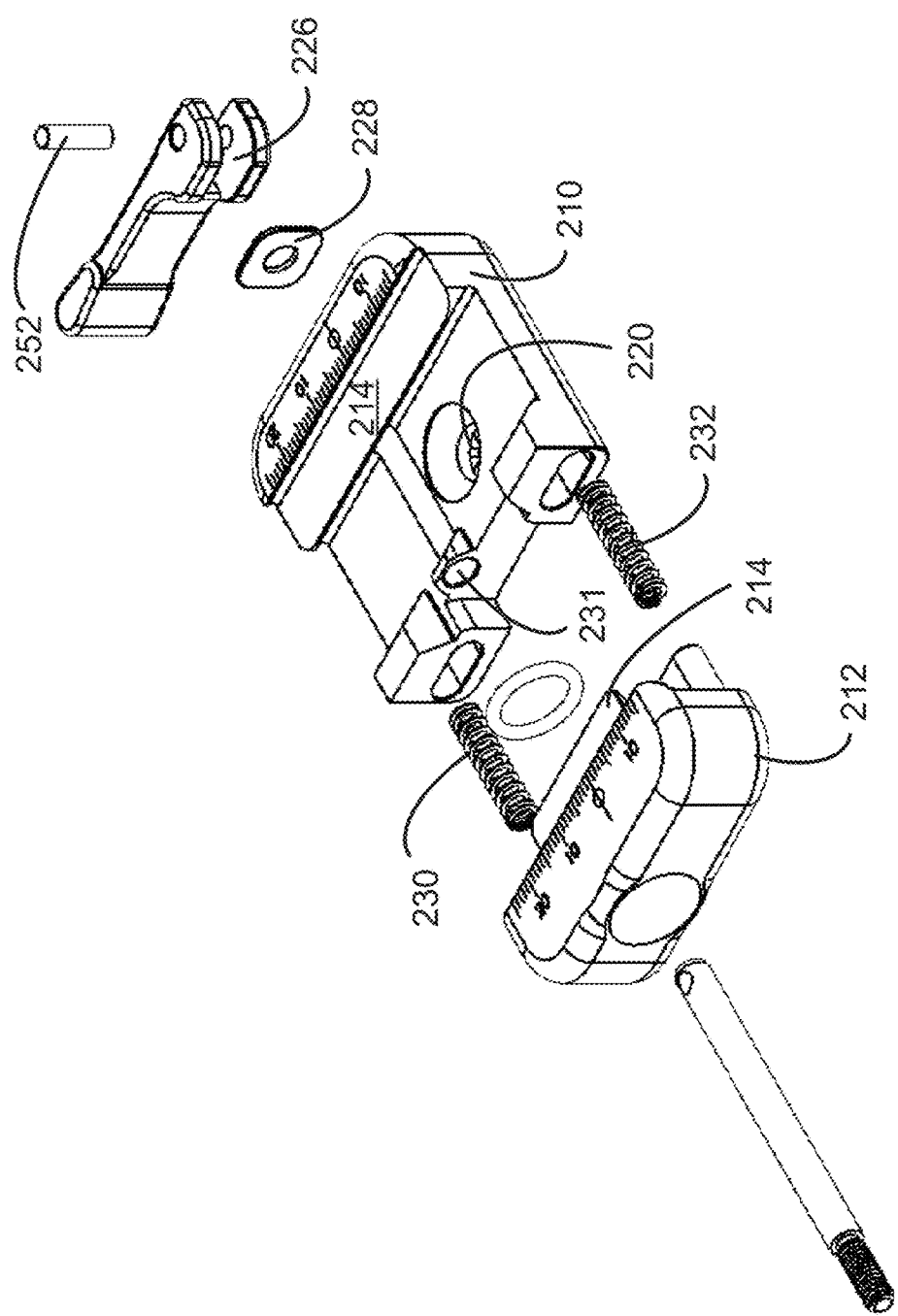
FIG. 11 illustrates an exploded view of a portion of the clamp assembly of FIG. 8.
Figure 12:
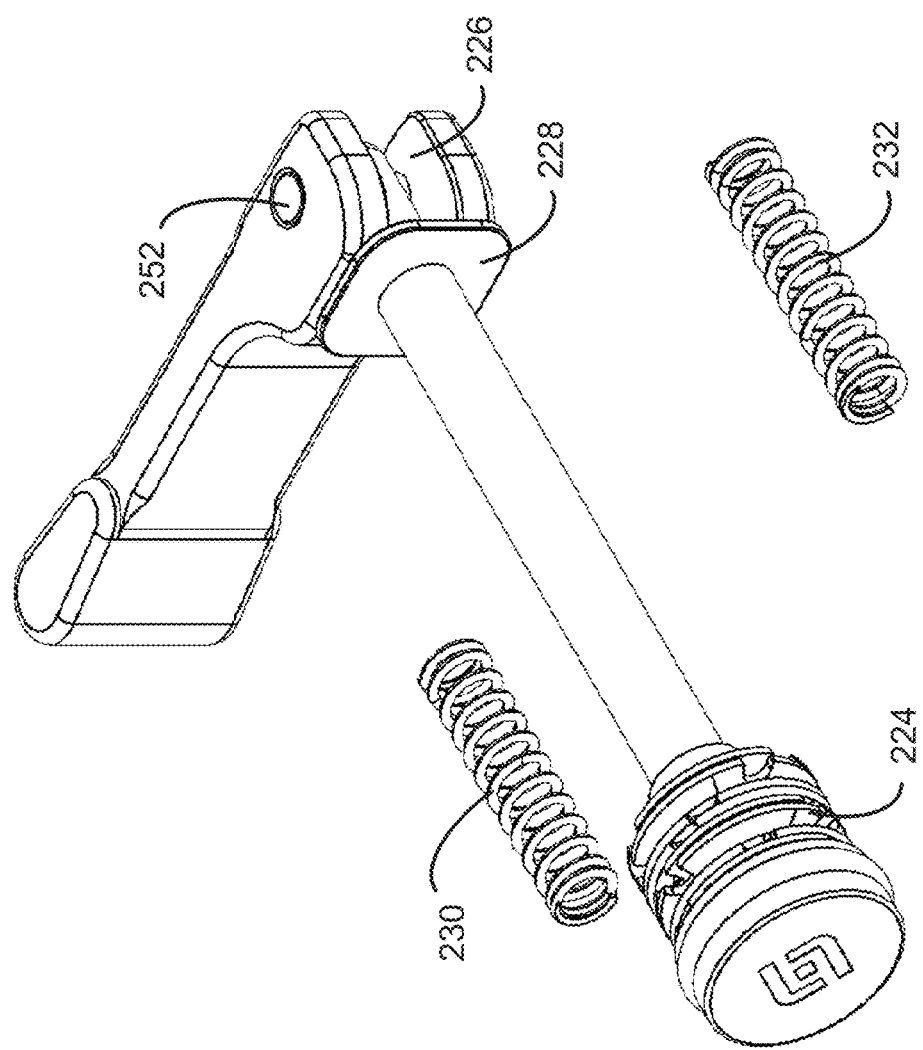
FIG. 12 illustrates a lever portion of the clamp assembly of FIG. 8.

Referring to FIG. 7, in many situations it is desirable to have a stable, yet portable, support to permit a shooter to reliably take long and extreme long distance shots (e.g., even beyond 1,000 yards). In many cases, it is desirable that the support is suitable for positioning a rifle of a shooter over two feet or more from the ground, preferably over three feet or more from the ground, and preferably at a height consistent with a standing position of the shooter from the ground. By positioning the support at an elevated height, the shooter is able to shoot over most obstacles without meaningfully compromising the stability of the system or otherwise meaningfully diminishing accuracy. One suitable type of support is a tripod that includes three legs, each of which may be moved inward and outward along an arc from an upper central region. In addition, each of the legs has an adjustable length so that the upper region may be leveled or otherwise oriented in any desired orientation. In addition, the upper region typically includes a threaded member, or otherwise, suitable to be attached to the base of an imaging device or a ball head. An exemplary tripod is illustrated in U.S. Pat.

No. 8,398,037, incorporated by reference herein in its entirety. Other supports include, for example, a monopod or a bipod.

Figure 13:
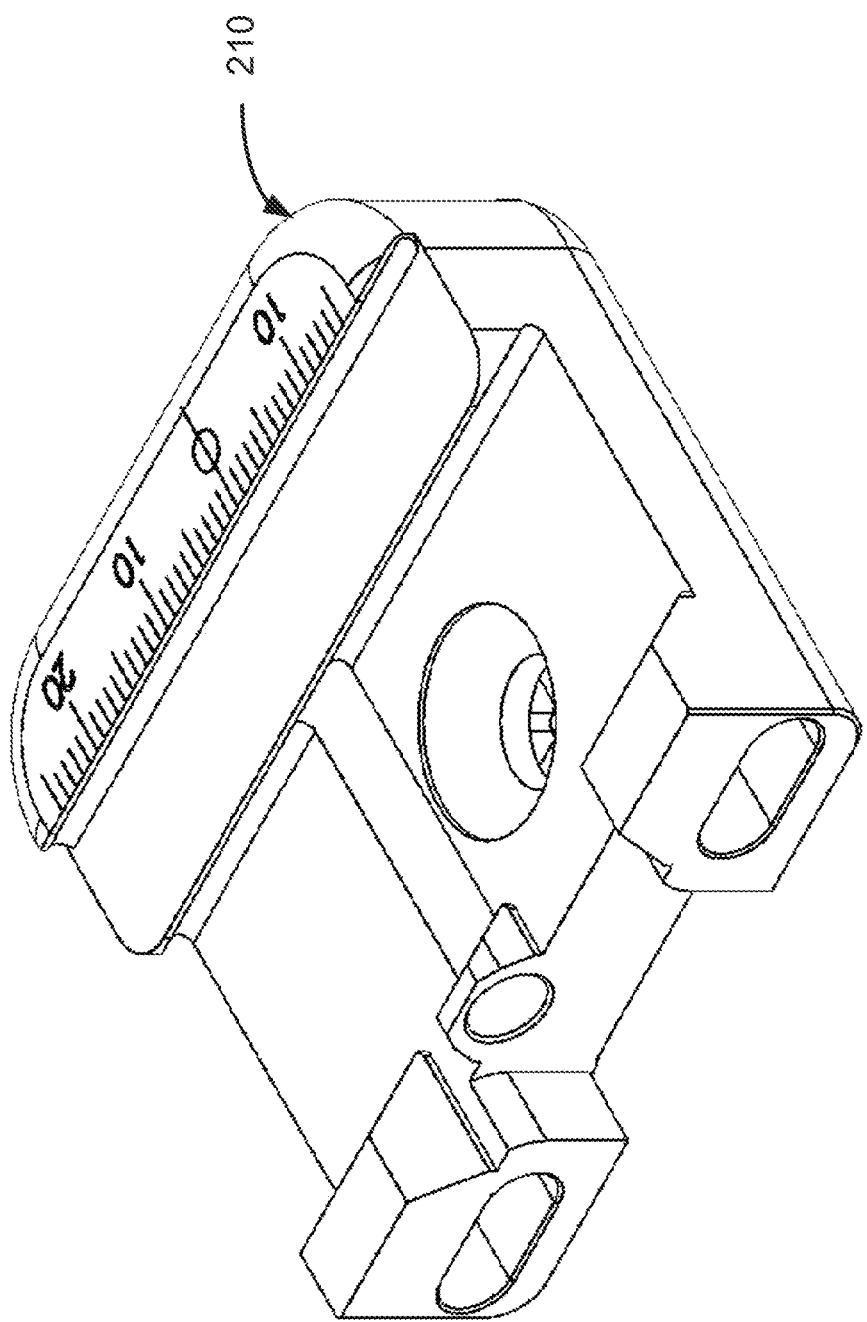
FIG. 13 illustrates a base portion of the clamp assembly of FIG. 8.
Figure 14:
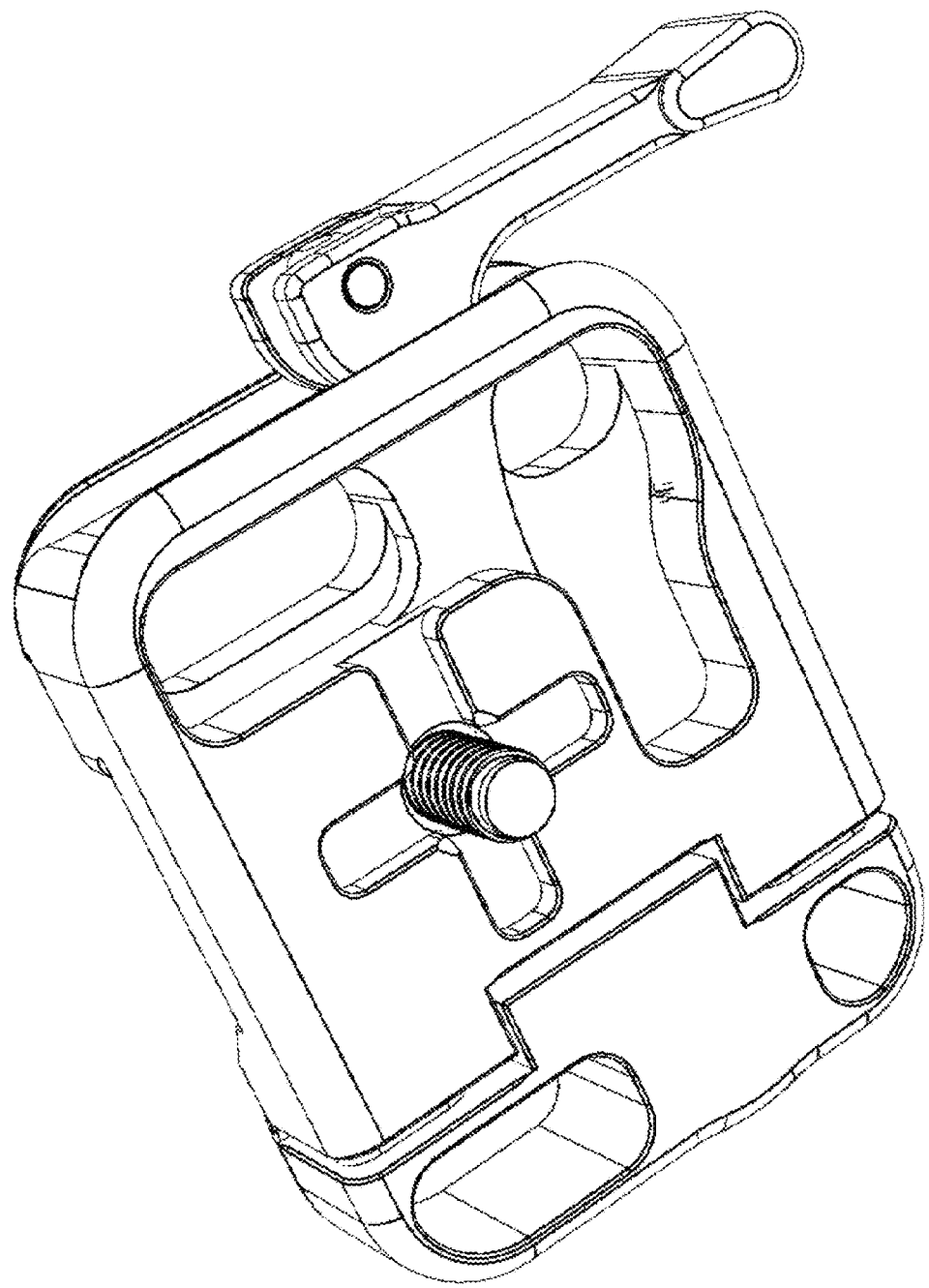
FIG. 14 illustrates a base view of the clamp assembly of FIG. 8.
Figure 15:
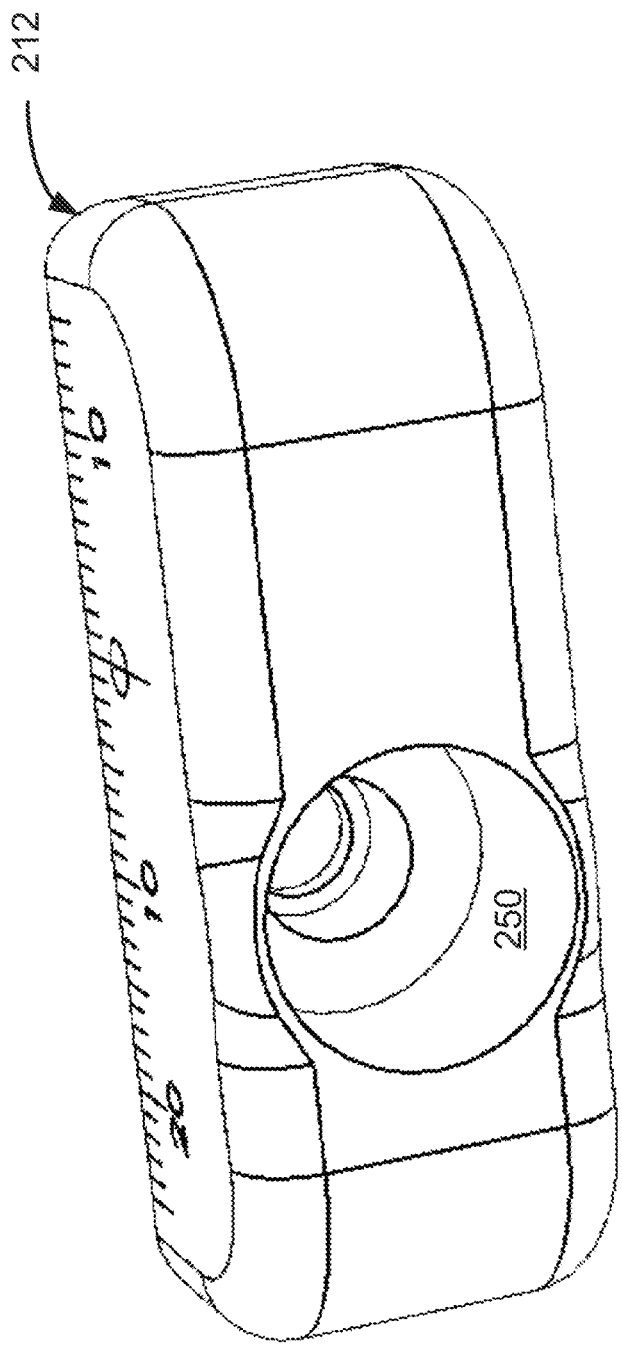
FIG. 15 illustrates a view of the adjustment arm of the clamp assembly of FIG. 8.
Figure 16:
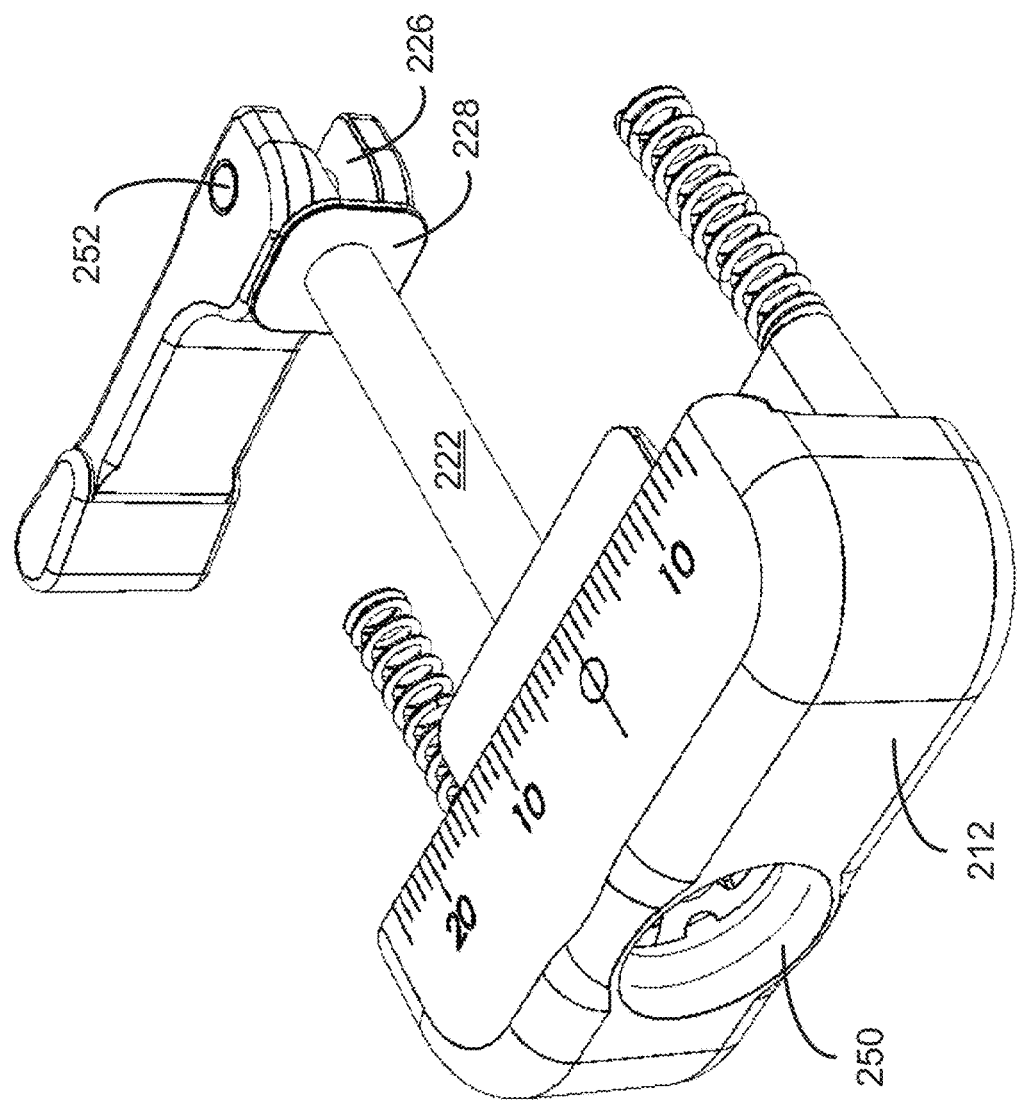
FIG. 16 illustrates another view of a portion of the clamp assembly of FIG. 8.
Figure 17:
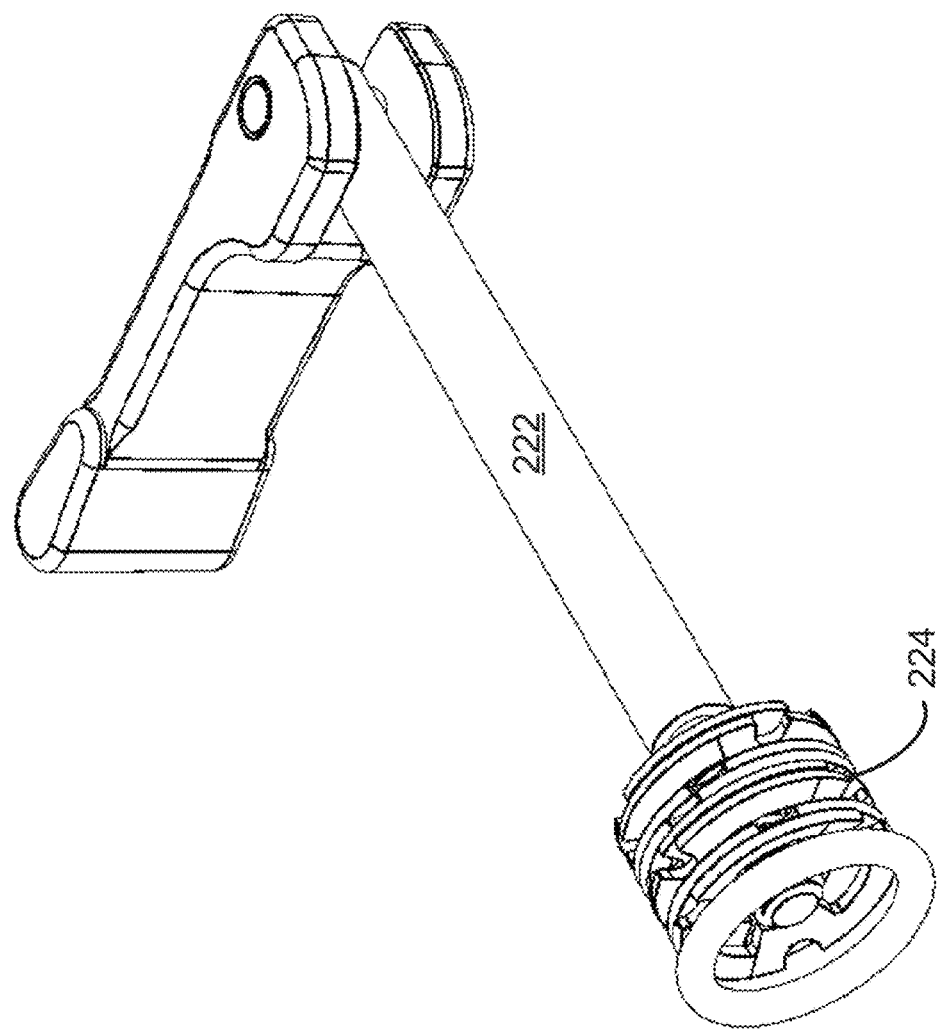
FIG. 17 illustrates a view of a portion of the clamp assembly shown in FIG. 8.

Referring to FIG. 8, FIG. 9, FIG. 10, and FIG. 11, a clamp assembly 200 is preferably detachably interconnected to a support or otherwise a ball head. The clamp assembly 200 includes a body 210 (see also FIG. 13) and an adjustable arm 212 (see also FIG. 11, FIG. 16, and FIG. 17) that together form an upper channel 214 having upper opposed side walls 216 and 218. The upper channel 214 may include a pair of opposing supporting surfaces, which are part of the body 210 and/or part of the adjustable arm 212. Preferably, at least one of the supporting surfaces of the upper channel 214 extends more than half of the width of body 210 and is preferably substantially centered with respect to the adjustable arm 212. The body 210 may define an opening 220 through which the clamp 200 may be secured to the upper portion of a tripod or other support. Referring also to FIG. 14, the base of the body 210 may include a tongue and groove interface to facilitate it to key the rotation of the clamp relative to a support, such as a ball head. Alternatively, the base of the body may include a planar surface suitable for a support having a flat upper surface. Alternatively, the base and/or the adjustable arm may define a lower pair of dovetail grooves for attachment to a suitable clamp. Referring also to FIG. 16 and FIG. 17, the adjustable arm 212 is slidably engaged along a stud 222 which is secured to a corresponding compression assembly 224 maintained within a cavity 250 (see FIG. 15) in the adjustment arm 212. The stud 222 is secured to a lever 226 together with a pin 252 extended through the stud 222 together with a washer 228, and arranged through an external opening 231 (see FIG. 11) in the base 210 and an external opening 250 in the adjustable arm 212 (see FIG. 16). The end of the stud 222 is secured to the compression assembly 224 in the adjustable arm 212. Rotation of the lever 226 selectively adjusts the width of the upper channel 214 and is accomplished through manual operation of the lever 226 fastened to the distal end of the stud 222. Alternatively, the adjustable spacing may be achieved with any other suitable structure. By way of example, one exemplary ball head is illustrated in U.S. Patent Publication No. 2006/0175482, incorporated by reference herein in its entirety.

The lever 226, operably attached to the adjustable arm 212, permits adjustment of the spacing between the side walls 216 and 218 so that the upper channel may selectively either grip or release a pair of grooves attached to a camera body (not shown). An exemplary set of grooves attached to a camera body is illustrated in U.S. Pat. No. 9,298,069, incorporated by reference herein in its entirety. Each respective side wall 216 and 218 is preferably angled upward and inward to facilitate engagement with such grooves. In this manner, photographic equipment may be quickly engaged or released from the clamp assembly by using the upper channel.

A pair of springs 230 and 232 may be interconnected between the body 210 (preferably retained in a depression) and the adjustable arm 212 (preferably retained in a depression) so that an outwardly directed force is exerted between the body 210 and the adjustable arm 212 to assist in maintaining the adjustable arm 212 in a suitable position. Other structures may be included that operably tend to exert an outward force on the adjustment arm with respect to the body. By way of example, the upper channel 214 may define a minimum channel that is generally a maximum of about 41 millimeters wide at the inside of the channel, generally about a minimum of 34 millimeters wide at the top of the side walls 216 and 218, with a height of generally about 4 millimeters, and an angle of substantially 45 degrees. Other channel sizes and structures may be used to correspond with the desired support structure for an imaging device.

In many situations, it is desirable to remove the camera being used to capture images of a scene from the clamp assembly and support a firearm together with a scope thereon to obtain a sharpened view of the particular scene. In many cases, the firearm includes a Picatinny rail on the lower surface thereof. To facilitate interconnection of the clamp assembly to the Picatinny rail, the clamp assembly preferably includes a lower channel, at an elevation lower than the upper channel, suitable for detachably interconnecting with the Picatinny rail.

The clamp assembly 200 includes the body 210 and the adjustable arm 212 that together form a lower channel 300 having lower opposed side walls 302 and 304. The lower channel 300 may include a supporting surface which is primarily defined by the body 210 and a portion of which may be defined by the adjustable arm 212, if desired. Preferably, the supporting surface of the lower channel 300 extends the width of body 210. The adjustable arm 212 is slidably engaged along the stud 222 which is secured to the corresponding compression assembly 224 in the adjustable arm 212. Movement of the adjustable arm 212 selectively adjusts the width of the lower channel 300 and is accomplished through manual operation of rotating the lever 226 fastened to the distal end of the stud 222. The lever 226, attached to the adjustable arm 212, permits adjustment of the spacing between the side walls 302 and 304 so that the lower channel may selectively either grip or release one or more rails attached to the base of a firearm. Each respective side wall 302 and 304 includes a portion of which is preferably angled upward and inward to facilitate engagement with such rails. The lower channel 300 also preferably defines a raised central portion, which may be defined by the stud 222 or any other structure, which preferably has a width suitable to be positioned between a pair of rails of the Picatinny rail. In this manner, the raised central portion will tend to inhibit the clamp sliding with respect to the Picatinny rail because the raised central portion will come into contact with one of the rails of the Pictinny rail. The adjustment mechanism may be achieved using an off-centered shaft, and may be more than one off-centered shafts and/or one or more centered shafts. Preferably, the shaft occupies the same region of space as the Picatinny clamp. The shaft may be positioned beneath the lower channel, if desired. As described, the shaft which is preferably part of the adjustment arm adjustment mechanism may be used to engage the grooves of the Picatinny clamp to prevent shifting of the clamp under loaded conditions. Alternatively, other structures may be used for engagement with the grooves of the Picatinny clamp, such as one or more pins or protruding features. In this manner, firearms may be quickly engaged or released from the clamp assembly by using the lower channel.

Figure 18:
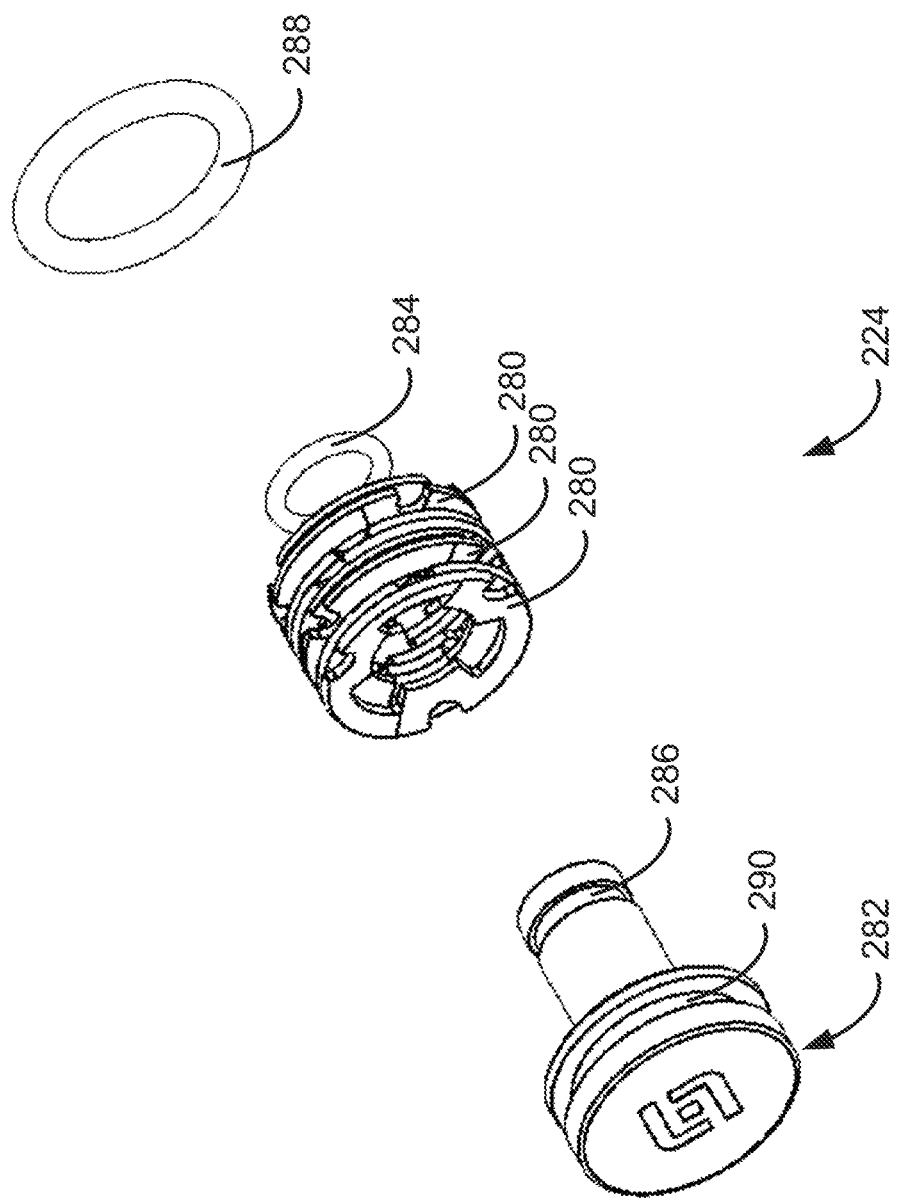
FIG. 18 illustrates an exploded view of a portion of the clamp assembly of FIG. 8.

Referring to FIG. 18, the compression assembly 224 may include one or more compression members 280, such as Belleville spring washers and/or disc springs. The amount of compression may be varied by changing the orientation of one or more of the compression members 280. The compression members 280 may be maintained on a threaded end member 282 by a resilient rubber washer 284 maintained in a groove 286. The compression assembly 224 may be maintained centered within the cavity 250 by another resilient rubber washer 288 maintained within another groove 290. In this manner, the compression assembly 224 includes one or more compression members that are centered on the compression assembly 224 while being aligned with the stud 222 and the compression assembly 224 is centered within the cavity 250 while being aligned with the stud 222.

The lever 226 is preferably a cam lever that includes a cam portion that rotates about a pivot axis as the cam lever is moved between a first, unlocked position, and a second, locked position. The cam portion has an asymmetrical shape about the pivot axis so that the lever pulls the adjustable arm inward as the lever is moved from a first position for releasing equipment from the clamp to a second position for gripping equipment to the clamp. Conversely, as the lever is moved from the second position to the first position, the pair of counterforce springs, housed within the body, push outward on the adjustable arm so that the channel expands.

The outwardly directed force applied by the springs on the adjustable arm is at a maximum when the lever is in the second position, i.e. when the channel is intended to grip equipment. The force applied by the springs therefore acts to undesirably loosen the grip on the equipment. The clamp, however, includes the compression assembly that prevents any outward movement of the adjustable arm that might otherwise result from the force applied by the springs. The compression assembly may preferably apply an inwardly-directed force on the adjustable arm that increases as the lever is moved from the first position towards the second position. The inward force applied on the adjustable arm by the compression assembly may preferably be greater than the outward force applied by the springs when the lever is in the second position. Also, the lever may preferably include an over-center detent position.

The lever in the first position, i.e. the released position the adjustable arm is spaced apart from the body by an applied force from the springs, thus widening the channel to allow the insertion or removal of equipment. The cam portion is oriented such that the compression assembly, which in this instance is a series of Belleville springs that act as a compression spring, is sufficiently relaxed so as to not apply a sufficient inward force on the adjustable arm to overcome the outward force of the springs. In this position, the cam portion preferably abuts the adjustment arm at a minimum distance from the pivot axis. As the lever is moved from the first position toward the second position, the cam portion pulls the compression assembly and the adjustable arm, inward. The compression assembly begins to compress to counterbalance the outward force of the springs applied to the adjustable arm as it moves inward.

In a first intermediate position where the lever has been moved to a position where the adjustable arm is flush with the body, the forces applied by the compression assembly and the springs counterbalance each other; further movement of the lever towards the second position, however causes the inward force applied by compression of the compression assembly to increase over that of the springs because the adjustable arm may not move any further while the compression assembly will continue to compress.

In a second intermediate position where the compression assembly is applying a maximum inward force on the adjustable arm where the cam portion preferably pulls the compression assembly at a maximum distance from the pivot axis. In this position, the inward force applied by the compression assembly to the adjustable arm is substantially greater than the outward force applied by the springs. Further movement of the lever toward either the first or second position will relax the compression assembly with respect to the maximum inward force as the distance from the pivot axis on which the compression assembly abuts the cam portion decreases.

In the second position, the lever is in an over-center detent configuration such that movement of the lever toward the first position will act to compress the compression assembly. Thus, the compression assembly resists movement of the lever toward the first position. Preferably, when in this position, the inward force applied by the compression assembly to the adjustable arm is still greater than the outward force applied by the springs. Alternatively, the two forces could be precisely counterbalanced. In this manner, the adjustable arm is locked into place because the springs do not apply a sufficient force to overcome that force applied by the compression assembly.

The compression assembly preferably applies a force to the adjustable arm and the lever that varies with the position of the lever. The force preferably increases as the lever is moved from the first position towards the second position. The force preferably reaches a maximum before the lever reaches the second position. More preferably, the force applied by the compression assembly is less than that maximum when in the second position, so that the force applied by the compression assembly also increases as the lever is moved from the second position towards the first position. As the lever is moved over a range of motion extending from the first position to the second position, the force increases to a maximum at a second intermediate position and then decreases as the lever continues to the second position.

The adjustable arm may cease its inward motion at a first intermediate position before the compression assembly has reached its maximum force. This may be preferable so that the inward force applied by the compression assembly on the adjustable arm, when the lever is in the second position, can still overcome the outward force applied by the springs even though the force applied by the compression assembly has fallen from its maximum. It should be further noted that the movement of the adjustable arm corresponds to the movement of the lever. Therefore, it is desirable that the lever move through a large percentage of its range of motion before the adjustable arm ceases to move, and achieve a maximum force in the remaining range of motion of the lever. For that reason, the force applied by the compression assembly in the clamp achieves its maximum value at approximately 80-90% of the lever's range of motion. It should be understood, however, that other embodiments may achieve a maximum force anywhere along the lever's range of motion, but preferably greater than 50%.

As the lever is moved from the first position, the force increases continuously to a maximum and decreases continuously until the lever reaches the second position. Alternative embodiments may design a lever that permits the force profile to decrease at certain intervals on the lever's path from the first position to the second intermediate position of maximum force, or to increase on the lever's path from that second intermediate position to a lesser force at the second position, or both. Preferably, however, the force profile is increasing over at least 65% of the lever's path from the first position to the second intermediate position and is decreasing over at least 65% of the path from the second intermediate position to the second position.

As previously described, the clamp assembly 200 with a "stationary" body together with a moving adjustment arm defines the upper clamp that is preferably compatible with Really Right Stuff™ and Arca-Swiss style dovetails. As previously described, the clamp assembly 200 with a "stationary" body together with a moving adjustment arm defines the lower clamp that is preferably compatible with the Pictinny rail. With separate structures at different elevations within the same clamp assembly facilitates a compact clamp assembly that defines a pair of adjustable spacing structures.

The lever 226 of the clamp assembly 200 may be rotated in a clockwise direction to engage the jaws of the clamp assembly 200 to secure a device therein. Also, lever 226 of the clamp assembly 200 may be rotated in a counter-clockwise direction to engage the jaws of the clamp assembly 200 to secure a device therein. The capability of rotating the lever 226 selectively in either a clockwise or a counter-clockwise direction to engage the jaws of the clamp assembly 200 permits the user to select the direction of rotation that is most comfortable for them. In addition, the capability of rotating the lever 226 selectively in either a clockwise or a counter-clockwise direction accommodates users regardless of whether they are right hand dominant or left hand dominant.

In another embodiment, the lever may be omitted if desired. The lever would be replaced with a rotational member, such as a screw. In this manner, the clamp assembly may secure a device therein by rotation of the screw in a first direction (e.g., clockwise) and may detach a device therein by rotation of the screw in a second direction (e.g., counter-clockwise).

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. An apparatus suitable for selectively engaging a plate for imaging equipment and suitable for selectively engaging a Picatinny rail for a firearm, said apparatus comprising:
   (a) said apparatus defining a portion of an upper channel having a first side wall;
   (b) said apparatus defining a portion of said upper channel having a second side wall capable of lateral movement with respect to said first side wall suitable to detachably engage a pair of angled edges of said plate;
   (c) said apparatus defining a portion of a lower channel having a third side wall;
   (d) said apparatus defining a portion of said lower channel having a fourth side wall capable of lateral movement with respect to said third side wall suitable to detachably engage said Picatinny rail, wherein said upper channel is at a higher elevation than said lower channel;
   (e) a lever capable of causing said lateral movement of said fourth side wall with respect to said third side wall and said second side wall with respect to said first side wall in such a manner to selectively secure either said Picatinny rail or said plate with said apparatus, wherein a first pair of said upper channel having said first side wall and said lower channel defining said third side wall and a second pair of said upper channel having said second side wall and said lower channel defining said fourth side wall are configured such said first pair and said second pair selectively securely engage either said Picatinny rail or said plate at a same distance between said first pair and said second pair, wherein said third side wall and said fourth side wall are approximately 21 mm apart at said same distance, wherein said first side wall and said second side wall are spaced apart a distance to selectively securely engage an Arca-Swiss compatible said plate when said third side wall and said fourth side wall are said approximately 21 mm apart at said same distance;
   (f) a substantially compressible member that exerts an outwardly directed pressure on said lever.

2. The apparatus of claim 1 wherein said first side wall is inclined inwardly and said second side wall is inclined inwardly.

3. The apparatus of claim 2 wherein said upper channel includes a first horizontal surface defined by said apparatus.

4. The apparatus of claim 3 wherein said upper channel includes a second horizontal surface defined by said apparatus.

5. The apparatus of claim 4 wherein said second horizontal surfaces extends less than the width of said apparatus.

6. The apparatus of claim 4 wherein said second horizontal surface is substantially centered on said apparatus.

7. The apparatus of claim 1 wherein said apparatus defines a pair of vertical openings therein that extend through said apparatus from a lower surface to an upper surface suitable to secure said apparatus to a support.

8. The apparatus of claim 1 wherein a base of said apparatus defines a tongue and groove interface.

9. The apparatus of claim 1 further comprising an exterior surface of said apparatus defining a pair of opposing dovetail grooves.

10. The apparatus of claim 1 wherein an arm is slidably engaged with said lever in a manner capable of causing said lateral movement.

11. The apparatus of claim 10 wherein a resilient member is operably interconnected with said arm to provide an outwardly directed pressure on said arm.

12. The apparatus of claim 11 wherein said third side wall is inclined inwardly and said fourth side wall is inclined inwardly.

13. The apparatus of claim 12 wherein said lower channel includes a horizontal surface defined by said apparatus.

14. The apparatus of claim 13 further comprising a raised portion protruding from said horizontal surface suitable to be maintained between a pair of adjacent rails of said Picatinny rail.

15. The apparatus of claim 13 wherein said raised portion is operably engaged with a slidably movement of said arm.

16. The apparatus of claim 1 wherein said substantially compressible member is maintained within said arm.

17. The apparatus of claim 16 wherein said substantially compressible member is supported by a central member.

18. The apparatus of claim 17 wherein said substantially compressible member is maintained in position by a pair of retaining members.

19. The apparatus of claim 18 wherein said retaining members are compressible members.

20. An apparatus suitable for selectively engaging a plate for imaging equipment and suitable for selectively engaging a Picatinny rail for a firearm, said apparatus comprising:
   (a) said apparatus defining a portion of an upper channel having a first side wall;
   (b) said apparatus defining a portion of said upper channel having a second side wall capable of lateral movement with respect to said first side wall suitable to detachably engage a pair of angled edges of said plate;
   (c) said apparatus defining a portion of a lower channel having a third side wall;
   (d) said apparatus defining a portion of said lower channel having a fourth side wall capable of lateral movement with respect to said third side wall suitable to detachably engage said Picatinny rail, wherein said upper channel is at a higher elevation than said lower channel;

(e) a lever suitable to cause said lateral movement of said fourth side wall with respect to said third side wall and said second side wall with respect to said first side wall in such a manner to selectively secure either said Picatinny rail or said plate with said apparatus, wherein a first pair of said upper channel having said first side wall and said lower channel defining said third side wall and a second pair of said upper channel having said second side wall and said lower channel defining said fourth side wall are configured such said first pair and said second pair selectively securely engage either said Picatinny rail or said plate at a same distance between said first pair and said second pair, wherein said third side wall and said fourth side wall are approximately 21 mm apart at said same distance, wherein said first side wall and said second side wall are spaced apart a distance to selectively securely engage an Arca-Swiss compatible said plate when said third side wall and said fourth side wall are said approximately 21 mm apart at said same distance;

(f) a substantially compressible member that exerts an outwardly directed pressure on said lever;

(g) at least one of (1) said lever extending beyond a first corner of said apparatus when in an opened positioned while said lever does not extend around said first corner of said apparatus when in said opened position, and (2) said lever extending beyond a second corner of said apparatus when in a closed positioned while said lever does not extend around said second corner of said apparatus when in said closed position.

21. The apparatus of claim 20 further comprising said lever extending beyond said first corner of said body when in said opened positioned.

22. The apparatus of claim 20 further comprising said lever extending beyond said second corner of said apparatus when in said closed positioned.

23. The apparatus of claim 21 wherein said lever does not extend around said first corner of said apparatus when in said opened position.

24. The apparatus of claim 22 wherein said lever does not extend around said second corner of said apparatus when in said closed position.

25. The apparatus of claim 20 wherein said apparatus defines a lower surface between said third side wall and said fourth side wall.

26. The apparatus of claim 25 wherein said apparatus defines an elongate member at least partially above a plane defined by said lower surface, where said elongate member is configured to engage said Picatinny rail when said Picatinny rail is engaged with said apparatus.

27. The apparatus of claim 26 wherein said apparatus defines only a single elongate member configured to engage said Picatinny rail when said Picatinny rail is engaged with said apparatus.

28. The apparatus of claim 1 further comprising said lever extending beyond a first corner of said apparatus when in an opened positioned.

29. The apparatus of claim 28 further comprising said lever extending beyond a second corner of said apparatus when in a closed positioned.

30. The apparatus of claim 28 wherein said lever does not extend around said first corner of said apparatus when in said opened position.

31. The apparatus of claim 29 wherein said lever does not extend around said second corner of said apparatus when in said closed position.

32. The apparatus of claim 31 wherein said apparatus defines a lower surface between said third side wall and said fourth side wall.

33. The apparatus of claim 32 wherein said apparatus defines an elongate member at least partially above a plane defined by said lower surface, where said elongate member is configured to engage said Picatinny rail when said Picatinny rail is engaged with said apparatus.

34. The apparatus of claim 33 wherein said apparatus defines only a single elongate member configured to engage said Picatinny rail when said Picatinny rail is engaged with said apparatus.

35. An apparatus suitable for selectively engaging a plate for imaging equipment, said apparatus comprising:

(a) a body defining a portion of a channel having a first side wall and said body defining an opening therethrough with a tapered upper portion, a body screw with a tapered first end portion engaged in face to face engagement with said tapered upper portion of said body and a second end portion having threads extending below said body when said body screw is engaged with said body, said body defining a pair of generally rectangular body openings on a side thereof;

(b) an arm defining a portion of said channel having a second side wall capable of lateral movement with respect to said first side wall suitable to detachably engage a pair of angled edges of said plate, said arm defining a pair of elongate generally rectangular arm tabs on a side thereof, the spacing and orientation between said pair of said elongate generally rectangular arm tabs and the spacing and orientation between said generally rectangular body openings arranged such that said pair of elongate generally rectangular arm tabs are slidably engageable within said generally rectangular body openings when said arm is engaged with said body;

(c) a first spring member maintained within a first of said generally rectangular body openings and a second spring member maintained within a second of said generally rectangular body openings, said first spring member exerts an outwardly directed pressure on a first of said pair of elongate generally rectangular arm tabs when said arm is engaged with said body, said second spring member exerts an outwardly directed pressure on a second of said pair of elongate generally rectangular arm tabs when said arm is engaged with said body;

(d) said body defining a stud body opening in said side of said body at a location between said pair of generally rectangular body openings on said side thereof, (e) said arm defining a stud arm opening in said side of said arm at a location between said pair of generally rectangular arm tabs on said side thereof, (f) an elongate stud extending within said stud body opening, said elongate stud supporting a plurality of spacing washers thereon, said elongate stud having a first end portion having threads to secure said elongate stud to said body, said elongate stud extending through said stud arm opening and engaged with a lever capable of causing said lateral movement;

(g) said lever defining a pair of lever openings therein with a lever pin extending through said lever and said pair of lever openings, said lever pin engaged with said elongate stud in such a manner that said lever is maintained in engagement with said arm;

(h) said lever arm having a side profile that includes an elongate handle portion that is substantially straight, said lever arm having said side profile that includes a body portion defining said pair of lever openings that is substantially rectangular.

\* \* \* \* \*